Figure 1:
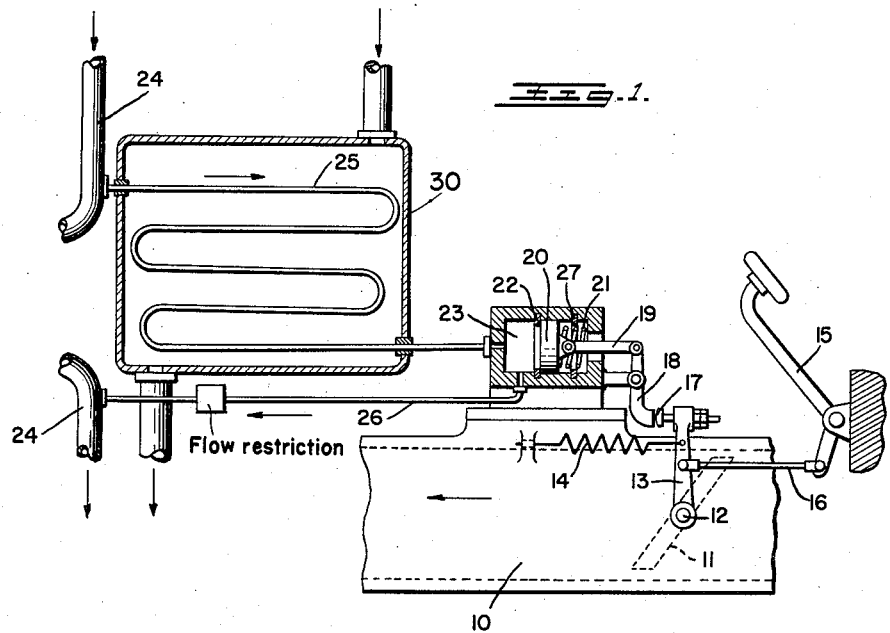

INVENTOR
FRIEDRICH K. H. NALLINGER

ATTORNEYS

United States Patent Office 2,906,253
Patented Sept. 29, 1959

2,906,253

CONTROL ARRANGEMENT FOR ADJUSTING THE IDLING SPEED OPERATION OF AN INTERNAL COMBUSTION ENGINE

Friedrich K. H. Nallinger, Stuttgart, Germany, assignor to Daimler-Benz Aktiengesellschaft, Stuttgart Unterturkheim, Germany Application September 17, 1956, Serial No. 610,352

Claims priority, application Germany September 21, 1955

13 Claims. (Cl. 123—119)

The present invention relates to a control arrangement for adjusting the idling speed output of an internal combustion engine upon starting thereof in dependence on the temperature condition of a fluid medium in the engine, such as the cooling water of the cooling system or of the lubricant.

For a period of time after starting the internal combustion engine, and more particularly, with lower outside temperatures for a longer period of time than with higher temperatures, the relatively viscous lubricant for the engine requires a relatively larger engine output for unobjectionable rotation in the idling speed than with an engine having attained the normal operating temperatures.

In recognition of this relationship, the prior art has already proposed a control arrangement which automatically varies the amount of idling speed air quantity in dependence on the temperature of the internal combustion engine, and more particularly, with temperature increases in a direction of greater throttling of the idling speed air quantity.

The present invention relates to a very simple and effective construction of such a control arrangement, and consists essentially in that a movable idling-speed abutment member for a throttling valve arranged in the combustion air stream is connected with an adjusting member adjusted in dependence on the engine temperature.

In the prior art, adjustable abutments are known which are adjusted in dependence on the engine temperature. However, the function of these prior art abutment members is entirely different, namely, they merely serve to control the upper limit of the throttle valve opening.

The adjusting member of an arrangement in accordance with the present invention may be in the form of a thermostat responsive to the temperature of a cooling medium or of the lubricant of the internal combustion engine.

According to another feature of the present invention, it is proposed for purposes of avoiding the installation of a relatively complicated thermostat to use a piston or diaphragm as the adjustment member which is actuated against the spring pressure of a spring by the pressure of the lubricant of the internal combustion engine. If the lubricant is supplied to the piston or diaphragm through a relatively long line of narrow cross section branched off the main lubricating line, as proposed in accordance with a further feature of the present invention, then an arrangement will result which provides a dependence of the time period of the adjustment on the degree of viscosity of the lubricant in that with colder lubricants, i.e., with more viscous lubricants, the lubricant requires a longer period of time until it can reach the space in front of the piston or diaphragm through the relatively long line of narrow cross section.

A return line of essentially smaller diameter than the supply line may lead back from this space in front of the piston to the main lubricating line. By the use of such an arrangement which provides for the metered return flow of the lubricant, it is possible to vary the time delay between the starting of the engine and the responsiveness of the adjusting member and to possibly increase the ratio of this time delay with a cold lubricant to the time delay with a warm lubricant as compared to installations without return flow for the lubricant.

If the lubricant supply line for the control arrangement is conducted through a heat exchanger in which the lubricant is brought into heat exchange relationship with the cooling medium of the internal combustion engine then the time which elapses between the starting of the engine and the adjustment of the throttle valve to the normal, lesser idling speed air quantity and therewith to normal idling speed output is dependent on the lubricant temperature as well as on the cooling medium temperature whereby the temperature conditions of the internal combustion engine are taken into consideration in a most exacting manner.

Accordingly, it is an object of the present invention to provide a control arrangement for an internal combustion engine in which the idling speed output of the engine is adjusted in dependence on the temperature of a fluid medium, such as the cooling medium and/or lubricant of the internal combustion engine.

A still further object of the present invention resides in the provision of a control arrangement for adjusting the amount of combustion air supplied to the internal combustion engine at idling speed thereof and during starting of the engine which is operated in dependence on the viscosity of the lubricant and possibly also in dependence on the temperature of the fluid medium of the cooling system for the internal combustion engine.

A still further object of the present invention is the provision of a control arrangement for varying the time delay between supplying an initial additional quantity of combustion air at idling speed and during starting of the internal combustion engine with a relatively cold engine, on the one hand, and between supplying the normal amount of idling-speed combustion air with an engine at normal operating temperature conditions.

A still further object of the present invention resides in the provision of a control arrangement for adjusting the amount of idling speed air quantity supplied to the engine in dependence on the viscosity of the lubricant of the engine which itself is in heat exchange relationship with the cooling medium of the engine cooling system.

Figure 2:
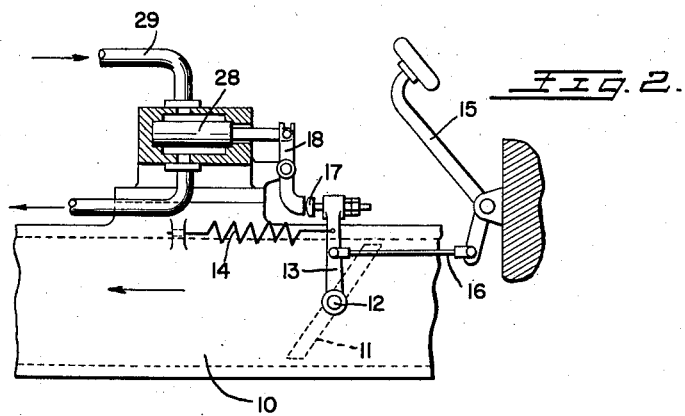
Figure 3:
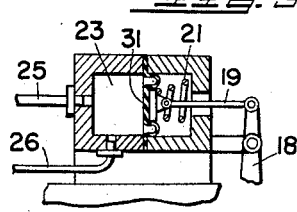

These and other objects, features and advantages of the present invention will become more obvious from the following description when taken in connection with the accompanying drawing which shows, for purposes of illustration only, two preferred embodiments of the present invention and wherein:

Figure 1 is a schematic view partially in cross section of a control arrangement in accordance with the present invention in which the adjustment member is actuated by a piston subjected to the pressure of the lubricant, Figure 2 is a partial schematic view of a different embodiment of a control arrangement in accordance with the present invention in which the adjusting member is controlled by a thermostat exposed to a fluid medium of the engine, and Figure 3 shows a partial view of the control arrangement of Figure 1 in which the adjustment member is actuated by a diaphragm.

Referring now to the drawing, wherein like reference numerals are used throughout the various views to designate like parts, and more particularly to Figure 1, reference numeral 11 designates a throttle valve mounted on a shaft 12 which is supported in the suction line or intake manifold 10 of the internal combustion engine. The shaft 12 is rigidly connected with the lever 13. A tension spring 14 operatively connected with the lever 13 normally tends to rotate the throttle valve 11 into the closed position thereof. The throttle valve 11 may be opened in opposition to the spring force of the spring 14 by means of a rod 16 and pedal 15 which may constitute the usual gas pedal arrangement of a motor vehicle.

The throttle valve 11 does not completely close the inlet line 10 but at all times keeps open a sufficient amount of space for the passage therethrough of the air quantity necessary during idling speed operation. The idling speed position of the throttle valve 11 is determined by an abutment member 17 which is adjustably positioned at the end of lever 13. The abutment member 17 abuts against the lever 18 under the effect of the tension spring 14. The lever 18 is connected with the piston 20 over a rod 19. The piston 20 is normally urged into its left position by the spring 21, the left end position of the piston 20 being determined by an abutment 22 which may be in the form of a ring. The space 23 formed in front of the piston 20, i.e., toward the left thereof as viewed in the drawing, is connected with the main lubricating line 24 of the internal combustion engine over a relatively long line 25 with a relatively small cross section which is tapped or branches off the main lubricating line 24. The line 25 is encased in a container 30 through which the cooling medium of the engine is circulated. A return line 26 of very small cross section leads back from the space 23 to the main lubricating line 24. A diaphragm 31, as shown in Figure 3, may be used in place of the piston 20.

*Operation*

The operation of the installation in accordance with Figure 1 is as follows:

The position indicated in the drawing represents the condition and position of the various parts prior to commencing starting of the internal combustion engine, i.e., when the engine is below normal operating temperatures. The throttle valve 11 permits a relatively large amount of idling speed air to pass through the intake manifold 10 to the engine, and more particularly such an amount as is necessary for the idling speed output required for the very cold engine. After starting the engine, a pressure builds up in the main lubricating line 24 which continues also slowly through the long and thin tap line 25 until it reaches the space 23. The time delay which is necessary therefor depends on how cold and viscous the lubricant is. As soon as the pressure in space 23 is built up sufficiently to overcome the spring pressure of spring 21, the piston 20 is moved toward the right and, more particularly, in the extreme case, up to the abutment 27. The lower end of the lever 18, which rotates clockwise, moves a corresponding amount toward the left since it is pivotally supported so that the spring 14 may move the throttle valve 11 into a position in which the remaining free cross section in the suction line 10 is further reduced and which corresponds to the supply of a smaller idling speed air quantity as is necessary for idling speed operation with an engine at normal operating temperatures.

The arrangement according to Figure 2 operates in principle in a manner similar to that described in connection with Figure 1. However, a thermostat 28 similar to that shown, for instance, in the Patent 1,838,408 is provided as the adjusting member which thermostat 28 is subjected to the fluid medium flowing through the line 29, such as the cooling water or lubricant. In this embodiment, the position of the idling speed abutment member 17, 18 is also dependent on the temperature of the cooling water or lubricant.

The present invention is not limited to the embodiments illustrated herein. For example, the throttle valve 11 may also be arranged in a separate idling speed air line instead of in the main inlet line. Moreover, instead of a throttling valve, any other blocking elements such as a slide valve may be used.

Accordingly, I intend to cover all the changes and modifications of which the present application is susceptible except as defined by the appnded claims.

I claim:

1. A control arrangement for controlling the idling speed output of an internal combustion engine when the temperature thereof is relatively low, such as occurs at start-up and especially of a gas-compressing fuel injection internal combustion engine, comprising means for adjusting the amount of air supplied to said engine during the idling speed thereof, an adjustable idling speed abutment member for adjusting the position of said first-mentioned means, and means including an adjusting member operatively connected with said idling speed abutment member and responsive to the temperature of said engine for adjusting said abutment member so as to reduce the amount of combustion air supplied to said engine as the subnormal temperature thereof gradually increases.

2. A control arrangement according to claim 1, wherein said adjusting member is a thermostat exposed to the cooling medium of said internal combustion engine.

3. A control arrangement according to claim 1, wherein said adjusting member is a thermostat exposed to the lubricant of said internal combustion engine.

4. A control arrangement for controlling the idling speed output of an internal combustion engine when the temperature thereof is relatively low, such as occurs at start-up and especially of a gas-compressing fuel injection internal combustion engine, comprising means for adjusting the amount of air supplied to said engine during the idling speed thereof, an adjustable idling speed abutment member for adjusting the position of said first-mentioned means, and means including an adjusting member operatively connected with said idling speed abutment member and responsive to the temperature of said engine for adjusting said abutment member so as to reduce the amount of combustion air supplied to said engine as the subnormal temperature thereof gradually increases, said last-mentioned means including spring-loaded means actuated in opposition to the spring force by the lubricant of said internal combustion engine.

5. A control arrangement according to claim 4, wherein said spring-loaded means comprises a piston and a spring normally urging said piston into a position corresponding to the position of said first-mentioned means with a relatively colder internal combustion engine.

6. A control arrangement according to claim 4, wherein said spring-loaded means comprises a diaphragm and a spring normally urging said diaphragm into a position corresponding to the position of said first-mentioned means with a relatively colder internal combustion engine.

7. A control arrangement according to claim 4, wherein said internal combustion engine includes a main lubricating line and a relatively long branch line of narrow cross section leading from said main lubricating line to said spring-loaded means.

8. A control arrangement according to claim 7, wherein a space is formed ahead of said spring-loaded means, and wherein a return line for the lubricant of considerably smaller cross section than said branch line is connected between said space and said main lubricating line.

9. A control arrangement according to claim 4, wherein said internal combustion engine includes a cooling system with a coolant medium, a main lubricating line, and a branch line of relatively great length and small cross section leading from said main lubricating line to said spring-loaded means in heat exchange relationship with said coolant medium.

10. A control arrangement according to claim 1, further comprising abutment means for the end positions of said adjusting member.

11. A control arrangement according to claim 1, wherein the mutual abutment between said first-mentioned means and said abutment member is adjustable.

12. A control arrangement for controlling the idling speed output of an internal combustion engine when the temperature thereof is relatively low, such as occurs at start-up and especially of a gas-compressing fuel injection internal combustion engine, comprising means for adjusting the amount of air supplied to said engine during the idling speed thereof, an adjustable idling speed abutment member for adjusting the position of said first-mentioned means, and means including an adjusting member operatively connected with said idling speed abutment member for adjusting gradually said abutment member so as to reduce the amount of combustion air supplied to said engine.

13. A control arrangement for controlling the idling speed output of an internal combustion engine when the temperature thereof is relatively low, such as occurs at start-up and especially of a gas-compressing fuel injection internal combustion engine, comprising means for adjusting the amount of air supplied to said engine during the idling speed thereof, an adjustable idling speed abutment member for adjusting the position of said first-mentioned means, and means including an adjusting member operatively connected with said idling speed abutment member for adjusting said abutment member so as to reduce the amount of combustion air supplied to said engine after a predetermined lapse of time corresponding to an increase of the temperature of said engine.

References Cited in the file of this patent

UNITED STATES PATENTS

| | | |
|---|---|---|
| 1,339,798 | Thompson | May 11, 1920 |
| 1,473,303 | Lightford | Nov. 6, 1923 |
| 1,740,259 | Morrison | Dec. 17, 1929 |
| 1,838,408 | King et al. | Dec. 29, 1931 |
| 1,996,245 | Hunt | Apr. 2, 1935 |
| 2,197,621 | Rushmore | Apr. 16, 1940 |
| 2,415,529 | Perrine | Feb. 11, 1947 |
| 2,667,154 | Ball | Jan. 26, 1954 |
| 2,817,323 | Nallinger | Dec. 24, 1957 |